Jan. 20, 1942.  G. H. ORR  2,270,549
CONTROL VALVE FOR FLUID OPERATED DEVICES
Filed Jan. 20, 1940
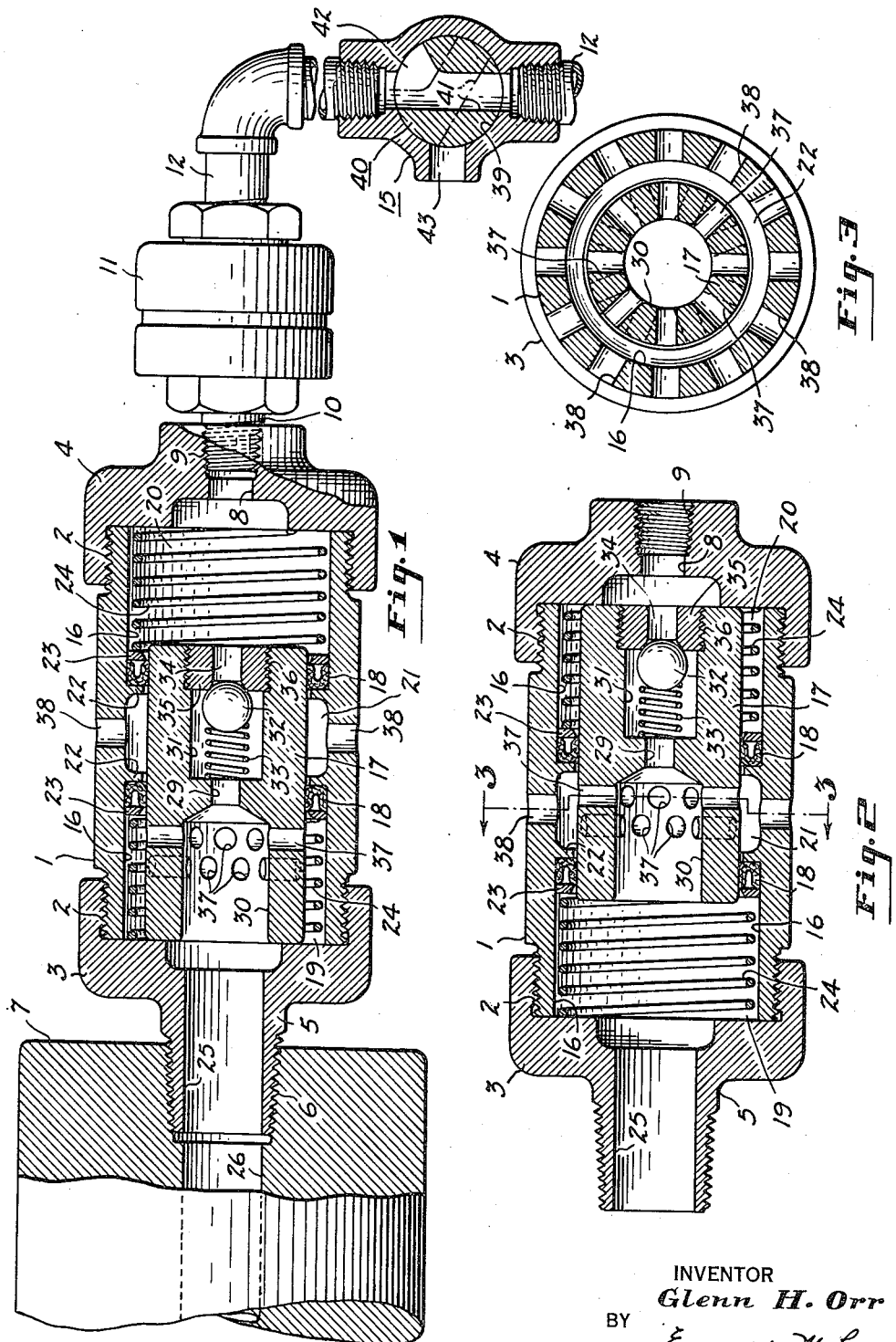
INVENTOR
*Glenn H. Orr*
BY
*Evans + McCoy*
ATTORNEYS Patented Jan. 20, 1942

2,270,549

UNITED STATES PATENT OFFICE 2,270,549

CONTROL VALVE FOR FLUID OPERATED DEVICES

Glenn H. Orr, Akron, Ohio, assignor to The General Tire & Rubber Company, Akron, Ohio, a corporation of Ohio Application January 20, 1940, Serial No. 314,887

6 Claims. (Cl. 277—61)

This invention relates to valves, and more particularly to control valves for regulating the admission of fluid to and the release of fluid from devices operated by fluid under pressure.

There are many devices which are operated by fluid under pressure, such, for example, as pneumatic drives and pneumatic clutches. In these devices fluid, such as air or gas, is introduced under pressure into an expansible chamber, such as the chamber of a hollow rubber annulus, and the expansion of the annulus effects the driving connection desired. While the driving connection is being made or disestablished, there is frictional sliding engagement between relatively movable parts which subjects the parts to wear, which may be very great in the case of large loads. By the use of high pressure fluid it has been possible to quickly establish the driving connection in a rotary clutch of the character under consideration. However, the release of such clutches has not been as rapid as desired because of the time element involved in releasing the relatively large quantity of air under pressure which is maintained in the expansible chambers of the fluid pressure devices during operation.

It is, therefore, an object of the present invention to provide a control valve for fluid operated devices which quickly releases fluid under pressure from such devices when so desired.

Another object is to provide a fluid control valve which may be utilized in the fluid supply line of a fluid operated device relatively close to such device, whether the latter be rotary or stationary, so that air, gas, or other fluid being released from the device travels a minimum distance and is quickly and efficiently released.

Another object is to provide a fluid control valve which is substantially automatic in operation to place the fluid supply passage of a fluid operated device in communication with the atmosphere when the fluid is to be released from the device, and to close such passage from the atmosphere when fluid is being introduced into the device and during operation of the device.

Another object is to provide a fluid control valve which may be utilized on stationary and rotary fluid operated devices and one which is simple in design and construction and inexpensive to manufacture. Other objects and advantages will become apparent from the following detailed description of a suitable embodiment of the invention which is made in connection with the accompanying drawing, in which like parts throughout the several views are indicated by the same numerals of reference.

Figure 1 is a fragmentary elevational view partly in section showing my improved valve installed in the fluid supply line of a rotary fluid operated device, such as the clutch disclosed in the co-pending application of Herman T. Kraft et al., Serial No. 301,970, filed October 30, 1939, and the clutch shown in Patent No. 2,185,986, issued January 2, 1940, to William C. McCoy;

Fig. 2 is a longitudinal sectional view of the valve showing the valve body displaced from the position shown in Fig. 1; and Fig. 3 is a transverse sectional view taken substantially on the line 3—3 of Fig. 2.

The valve comprises a housing 1 which may be in the form of a substantially cylindrical tube or sleeve having external threads 2 at opposite ends which threadedly receive flanged end members 3 and 4. An axial extension 5 on the end member 3 is formed with threads 6 and is screwed into the end of rotatable member or shaft 7 of the pneumatic clutch or other fluid operated device to which the control valve is to be attached. In this manner the valve of the present invention may be rigidly secured to the movable or rotating device and, as will later appear, its operation is substantially automatic to control the flow of fluid into the device and the release of fluid from the device to the atmosphere.

The end member 4 is formed with an axial passage 8 threaded at 9 to receive a nipple 10 of a rotary coupling or joint 11, which is connected by suitable conduit or piping 12 and a valve 15, to be later described, to a source of air or other fluid under pressure (not shown).

Within the housing 1 is formed a chamber having substantially cylindrical walls 16 and a movable valve body or piston 17 of substantially cylindrical form is disposed within the chamber of the housing. Disposed about the piston body 17 in circumferential sealing engagement therewith and with the cylindrical walls 16 of the housing chamber are a pair of spaced seals 18. These seals are disposed in spaced substantially parallel relation to one another in the central part of the chamber to divide or separate the latter into a pair of spaced cells 19 and 20 within the opposite ends of the housing, and an exhaust cell 21 which is between the end cells 19 and 20 at the central part of the chamber and is of annular form extending around the valve body 17. The annular sealing rings 18 may be formed of suitable flexible material, such as leather, felt, or rubber, and may be retained in spaced relation by lugs or flanges 22 which extend radially inwardly from the walls of the housing chamber to engage the sides of the sealing rings. The piston or valve body 17 is of less diameter than the chamber in the housing 1 to provide an annular space for the sealing rings 18 and the inwardly extending projections or lugs 22. Annular rings 23 may be provided in the space between the piston and the walls of the chamber to resiliently press against the flexible or deformable sealing rings 18 to retain the latter in position against the flanges or lugs 22 and to maintain a fluid-tight seal between the piston and the walls of the chamber. Helical compression springs 24 may be used to press the rings 23 against the seals 18, the springs being disposed in the annular spaces between the piston and the chamber walls and seated against the end members 3 and 4.

The passage 8 in the end member 4, which, as previously mentioned, communicates with the source of fluid under pressure, opens into the cell 20 in the right hand end of the housing 1 as viewed in Figs. 1 and 2, and the cell 19 in the left hand end of the housing communicates through an opening and passage 25 in the end member 3 with a passage 26 in the rotatable member or shaft 7.

Extending longitudinally through the piston or valve body 17 is a passage 29 which connects the cell 19 with the cell 20. This passage has increased diameter portions 30 and 31 at opposite ends of the piston, the passage portion 31 receiving a ball 32 and a helical compression spring 33 which comprise a check or one-way valve. The ball 32 is held across one end of a passage 34 in a plug 35 threaded at 36 into the passage portion 31 of the piston or valve body 17. Thus, the check valve in the piston passage allows the flow of high pressure fluid from the cell 20 through the piston and into the cell 19 while preventing, or substantially preventing, the flow of fluid from the cell 19 to the cell 20. It is to be understood that the spring 33 is relatively weak and readily yields to permit the flow of fluid through the passage 29 from the cell 20 to the cell 19 when high pressure fluid is supplied to the former from the source.

The valve body or piston 17 is of less length than the chamber in the housing 1 so that the valve body may be moved or reciprocated back and forth in the chamber under the influence of fluid or air pressure between the positions indicated respectively in Fig. 1 and Fig. 2. A number of radial openings or passages 37 are formed through the walls of the piston body 17. These openings communicate with the passage portion 30 and are so located that when the piston is at its extreme limit of movement to the right, as shown in Fig. 2, they are in communication with the annular exhaust passage 21. Exhaust openings 38 through the walls of the housing 1 open into the exhaust cell 21 and place the latter in communication with the atmosphere, so that when the piston 17 is in the position shown in Fig. 2, fluid under pressure in the left hand end or cell 19 of the valve is released through the passages 30 and 37 in the piston 17 to the exhaust cell 21, from which it is released through the passage 38 to the atmosphere.

Movement of the piston or valve body 17 to its limit of movement to the left, as shown in Fig. 1, carries the ports or openings of the piston passages 37 from between the sealing rings 18, so that the latter seal the exhaust cell 21 from the other portions or cells of the housing chamber and prevent the escape of fluid under pressure to the atmosphere through the exhaust openings 38.

The valve 15 previously mentioned and which regulates the flow of high pressure fluid from the source to the control valve and the fluid operated device is formed with a cylindrical bore 39, in which is rotatably mounted a valve body 40 having a transverse passage 41 provided with an enlarged or flared opening 42 at one end thereof.

When the valve body 40 of the valve 15 is turned, manually or otherwise, to the position indicated by the full lines, the passage 41 is placed in communication with the conduits 12 which are connected to the valve 15 so as to permit the flow of fluid under pressure from the source through the rotary joint 11 and into the cell 20 of my improved valve. The pressure of the fluid or gas in the cell 20 acting on the right hand end of the piston or valve body 17 forces or moves the latter to the left to substantially the position shown in Fig. 1 of the drawing. In this connection it is to be observed that the passages 29 and 34 through the valve body or piston 17 are sufficiently small relative to the area of the end of the piston subjected to the high pressure fluid in the cell 20 so that enough resistance is provided against the flow of fluid through the passage which connects the cell 20 with the cell 19 to maintain a sufficiently high pressure differential in the cell, at least during the initial period of gas or fluid flow through the controlled valve, to actuate or shift the piston to the left to the position shown in Fig. 1. If desired, the strength of the spring 33 may be increased or decreased to hold the ball check 32 against the opening in the passage 34 with sufficient force to resist the flow of fluid or gas through the passage connecting the cells and thereby maintain a pressure differential between the cells which assures the shifting of the piston to the position which seals the atmospheric exhaust passages 38 from the cell 19.

Subsequent to the shifting of the valve body or piston 17 to the position shown in Fig. 1, and after an air or fluid pressure has been maintained in the cell 20 for a period of time from the source through the valve 15 and conduits 12, the pressure in the cell 19 and in the fluid operated device may become substantially equal to that in the cell 20. When such a condition exists there is no flow of fluid or gas through the passages 29 and 34 between the cells, and the piston or valve body 17 is maintained through frictional engagement thereof by the resilient and flexible sealing means or annuluses 18 into the position shown in Fig. 1. Thus the valve body prevents the escape of fluid or air to the atmosphere from the system.

When it is desired to release air or fluid from operating device, for example, to release a pneumatic clutch if such is the device with which the control valve is used, the valve body 40 in the valve 15 is moved manually or otherwise to the position illustrated by the broken lines. The opening into the conduit 12 leading to the source of fluid or air under pressure is thus sealed and the conduit or pipe 12 leading to the coupling 11 and my improved control valve is placed in communication with the atmosphere through a passage 43 in the housing of the valve 15 through or by means of the flared or enlarged end opening 42 in the valve body passage 41. Fluid under pressure in the cell 20 is thus released to the atmosphere through the valve outlet 43, causing the pressure in the cell 20 to fall below that in the cell 19 and passage 26 of the fluid operated device. The resulting pressure differential between the cells in my control valve operating on the left hand end of the piston or valve body 17 forces the latter to the right to substantially the position illustrated in Fig. 2. The ball check 32 substantially prevents the flow of fluid through the passages 29 and 34 which connect the cells 19 and 20, so that regardless of the speed or rate at which the air or other fluid is released from the cell 20, the movement of the valve body or piston 17 to the position illustrated in Fig. 2 is assured. In the position shown in Fig. 2 the passages 37 place the cell 19 in communication with the exhaust cell 21 and exhaust passages 38, so that the high pressure fluid or air from the fluid operated device is released to the atmosphere quickly and in a relatively short time interval, so that the fluid operated device is quickly deenergized or released if the same be a clutch or brake. The frictional engagement of the valve body or piston 17 by the seals 18 which embrace the same prevents inadvertent or undesired movement of the piston lengthwise in the housing chamber and restricts the endwise movements of the valve body or piston to those induced by the pressure differentials in the cells 19 and 20.

Thus the present invention provides a fluid control valve which is substantially automatic in operation and quickly releases fluid or air from a fluid operated device so that the latter may be quickly and easily deenergized by manual or other manipulation of a simple valve.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. A valve comprising a chambered housing, fluid passages opening into spaced portions of the chamber, a movable body in the chamber, spaced means effecting seals between the body and the chamber walls to divide the chamber into an exhaust cell and a pair of cells each in communication with one of the openings, an outlet opening from the exhaust cell to the atmosphere, passages in the body located to place the outlet cell in communication with one of the other cells in one position of the body, said body being formed to seal the outlet cell from the other cells when in another position, a passage between the pair of cells, and a check valve in said last named passage.

2. A valve comprising a chambered housing, fluid passages opening into spaced portions of the chamber, a movable body in the chamber, spaced means effecting seals between the body and the chamber walls to divide the chamber into an exhaust cell and a pair of cells each in communication with one of the openings, an outlet opening from the exhaust cell to the atmosphere, passages in the body located to place the outlet cell in communication with one of the other cells in one position of the body, said body being formed to seal the outlet cell from the other cells when in another position, a passage in the body and communicating with each of said pair of cells, and a check valve in said last named passage to substantially restrict the flow of fluid therethrough to a single direction.

3. A valve comprising a chambered housing, fluid passages opening into spaced portions of the chamber, a movable body in the chamber, a pair of annular sealing rings disposed about the body in spaced relation to one another and against the walls of the chamber to effect seals between the body and the housing which divide the chamber into an exhaust cell and a pair of cells each in communication with one of the openings, an outlet opening from the exhaust cell to the atmosphere, passages in the body located to place the outlet cell in communication with one of the other cells in one position of the body, said body being formed to seal the outlet cell from the other cells when in another position, a passage between the pair of cells, and a check valve in said last named passage.

4. A fluid valve comprising a housing having walls which define a generally cylindrical chamber therein, a body disposed in the chamber, spaced seals embracing the body and extending between the body and the chamber walls to divide the chamber into an exhaust cell which is disposed around the body between the seals and end cells into which project the ends of the body, means defining a service passage communicating with one end cell, means defining an exhaust passage communicating with the exhaust cell, means defining an inlet passage communicating with the other end cell, means defining a passage extending between the end cells, a one way valve in said last named passage, said chamber being of greater length than the body to permit longitudinal sliding therein of the latter while embraced by the seals, means limiting said sliding to prevent movement of the body ends past either seal, and a passage in the body communicating with said one end cell and opening through the side of the body, said limiting means being arranged so that at one limit of movement of the body the side opening is disposed between the seals and in communication with the exhaust cell and at the other limit of movement of the body the side opening is sealed from the exhaust passage.

5. In a fluid valve construction, a cylindrical tube, members secured on the ends of the tube to close the same, said members having fluid passages formed therein, a piston body disposed in the tube and slidable longitudinally therein, means extending inwardly from the tube and embracing spaced portions of the piston to cooperatively define therewith a centrally disposed exhaust cell and a pair of spaced end cells communicating with the fluid passages, an exhaust passage formed in the tube and communicating with the exhaust cell, a longitudinal passage through the piston, a radial passage in the piston communicating with said longitudinal passage and opening through a port in one side of the piston, said port being in communication with the exhaust cell at one limit of the piston movement and being sealed from the exhaust cell at the other limit of the piston movement, and one way valve means in said longitudinal passage.

6. A valve for controlling fluid flow comprising a chambered housing, a movable body in the housing chamber, spaced means effecting seals between the body and the chamber walls to divide the chamber into an exhaust cell and a pair of spaced cells, means defining fluid passages in the housing opening into the spaced cells, means providing an outlet passage through the housing from the exhaust cell, means defining a fluid passage extending between the spaced cells and a check valve in said last named passage, said body being slidable longitudinally in the housing chamber and movable from a position in which the exhaust cell is sealed thereby from the spaced cells to a position in which the exhaust cell is in communication with one of the spaced cells.

GLENN H. ORR.